Sept. 11, 1928.                D. W. STOVEN                1,684,047
                                DAIRY UTENSIL
                        Filed Aug. 2, 1927      2 Sheets-Sheet 2
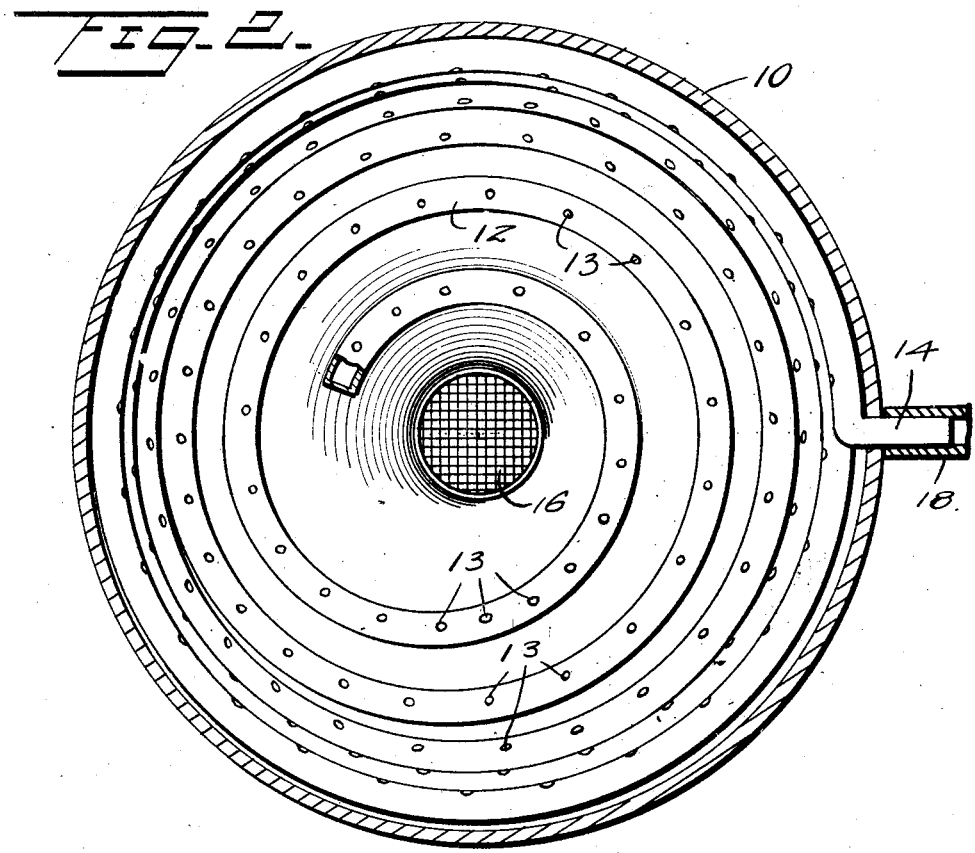
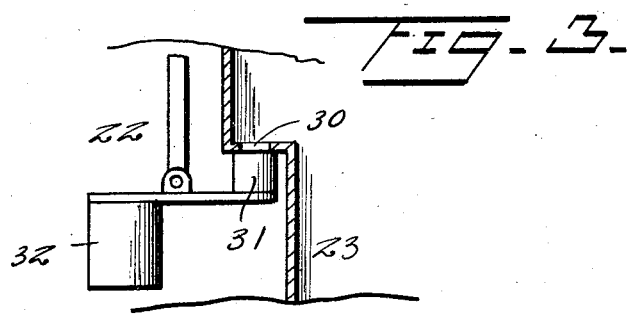
INVENTOR.
D. W. Stoven
BY
Watson E. Coleman ATTORNEY.

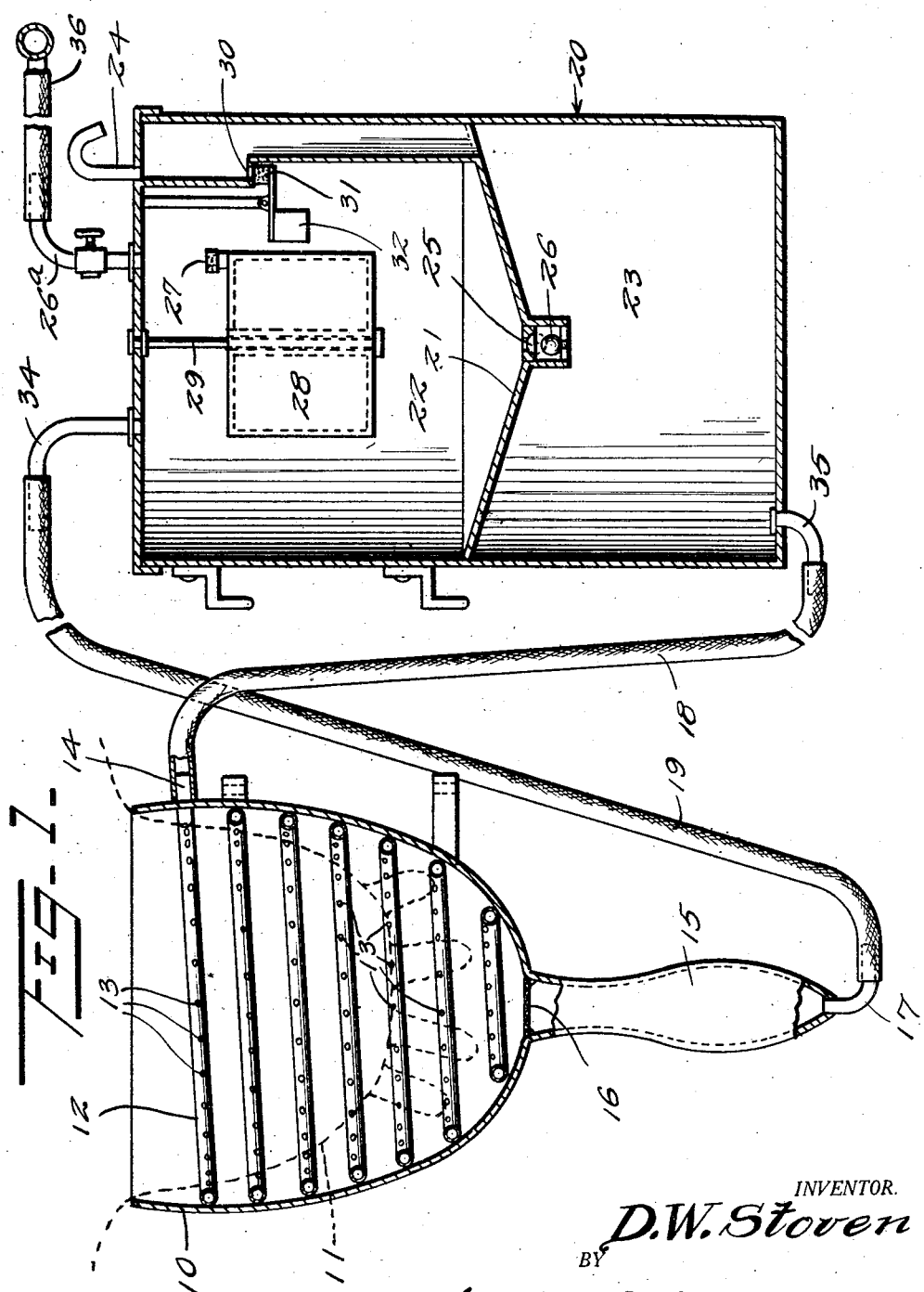

Patented Sept. 11, 1928.

1,684,047

UNITED STATES PATENT OFFICE.

DETLEF W. STOVEN, OF PARK CITY, UTAH.

DAIRY UTENSIL.

Application filed August 2, 1927. Serial No. 210,207.

This invention relates to dairy utensils and more particularly to an udder washing machine.

An important object of the invention is to provide a device of this character which may be operated directly from the suction line employed where milking machines are used.

A further object of the invention is to provide a device of this character which may be very readily and cheaply constructed, which will be durable and efficient in service and a general improvement in the art.

These and other objects I attain by the construction shown in the accompanying drawings, wherein for the purpose of illustration is shown a preferred embodiment of my invention and wherein:—

Figure 1 is a vertical sectional view through udder washing mechanism constructed in accordance with my invention;

Figure 2 is a horizontal sectional view through the udder engaging casing, a portion of the spray tube being broken away to disclose the closed end thereof;

Figure 3 is a detail view showing the air vent control of the vacuum chamber.

Referring now more particularly to the drawings, the numeral 10 generally designates a receptacle shaped about its upper edge to fit about the udder 11 of a cow close to the body and sufficiently deep to comfortably accommodate the udder. Coiled about the interior wall of this receptacle is a tube 12 having spaced perforations 13. The upper end of this tube extends through the wall of the receptacle 10, as indicated at 14, and is open, whereas the lower end thereof is closed. At the bottom of the receptacle, a sump 15 is formed separated from the main chamber of the receptacle by a screen 16. At the lower end of this sump, an outlet 17 is provided and the end 14 of the tube 12 and outlet 17 are adapted for connection with flexible tubes 18 and 19.

The numeral 20 generally designates a casing subdivided by a horizontal partition 21 to provide upper and lower chambers 22 and 23. The upper end of the lower chamber is vented, as at 24, and the upper and lower chambers are in communication through a port 25 controlled by a check valve 26 closing toward the chamber 22. The chamber 22 at its upper end has an inlet 26ª controlled by a float operated valve 27, at present illustrated as directly carried by a float 28, which rises and falls with the liquid contents of the chamber 22 upon a guide rod 29. The chamber 22 has a vent port 30 communicating with the vent 24 of the chamber 23 and normally closed by a valve 31, which is opened by a float 32 carried by one end of the pivoted arm 33 at the opposite end of which the valve 31 is connected. This float, when the fluid level in the chamber 22 attains a predetermined height, opens to permit air to enter the chamber 22.

The chamber 22 has a further inlet 34, which is adapted for connection with the tube 19, which communicates with the outlet 17 of the sump of the casing 10, while the chamber 23 has an outlet 35 adapted to communicate with the tube 18. The casings 20 and 10 have coacting catch elements whereby these casings may be secured to one another.

In the use of the device, the inlet 26ª of the casing 20 is connected with a suitable source of suction and the tank 23 filled with the liquid to be used in washing the udder which may be either clean water or water to which a disinfectant has been added. The casing 10 is placed against the cow's udder and suction created within this casing through the compartment 22, inlet 34 and conduit 19 will perfect the seal between the upper edge of the casing and the udder. As the vacuum created within the casing 10 increases, water is drawn from the compartment 23 through the conduit 18 and passes out through the openings 13 against the udder, washing any dirt therefrom. This water passes downwardly into the sump and dirt is removed therefrom by the screen 16. From the sump, it is drawn through the conduit 19 to the inlet 34 and so to the chamber 22. At this time, the valve 26 is closed and the water collecting in the chamber 22 causes the float 28 to rise, bringing the valve 27 into engagement with the inlet 26ª to close the same and elevating the float 32 to open the vent 30. As soon as the vent 30 opens, the fluid in the container 22 drops to the compartment 23, valve 27 opens and suction operation through the tube 19 is continued. It will be obvious that any suitable source of suction may be employed and in the present instance, I have merely illustrated the inlet 26ª as connected by a conduit 36 with the ordinary suction line employed in dairies where milking machines are used. Any other suitable source of suction may, however, be employed.

Since the construction hereinbefore set forth is capable of a certain range of change and modification without materially departing from the spirit of the invention, I do not limit myself to such specific structure except as hereinafter claimed.

I claim:—

1. In udder washing apparatus, a casing adapted to engage against and seal to an udder adjacent the body of the animal, a water receptacle communicating with the casing, suction operated means likewise communicating with the casing for causing a circulation of water through the water receptacle and casing and means within the casing for directing water circulating therethrough against an udder contained therein.

2. In udder washing apparatus, a casing adapted to engage against and seal to an udder adjacent the body of the animal, a water receptacle communicating with the casing, suction operated means likewise communicating with the casing for causing a circulation of water through the water receptacle and casing, means within the casing for directing water circulating therethrough against an udder contained therein and means automatically returning water from the suction operated means to the water receptacle when a predetermined amount of water has collected in the suction operated means.

3. In udder washing apparatus, a casing adapted to engage against and seal to an udder adjacent the body of the animal, a water receptacle communicating with the casing, suction operated means likewise communicating with the casing for causing a circulation of water through the water receptacle and casing, means within the casing for directing water circulating therethrough against an udder contained therein, and means within the casing for removing dirt from water passing therethrough and after its contact with the udder.

4. In udder washing apparatus, a casing adapted to engage against and seal to an udder adjacent the body of the animal, a water receptacle communicating with the casing, a tank likewise communicating with the casing, a connection between the tank and water receptacle closed during application of suction to the interior of the suction tank, means within the casing directing water drawn from the water receptacle by suction within the suction tank against an udder contained in the casing and means in the suction tank for cutting off suction therein when a predetermined amount of water has been drawn thereinto from the water receptacle.

5. In udder washing apparatus, a casing adapted to engage against and seal to an udder adjacent the body of the animal, a water receptacle communicating with the casing, a tank likewise communicating with the casing, a connection between the tank and water receptacle closed during application of suction to the interior of the suction tank, means within the casing directing water drawn from the water receptacle by suction within the suction tank against an udder contained in the casing, a source of suction in communication with the suction tank, float operated means for cutting off communication between the source of suction and the suction tank and placing the interior of the suction tank in communication with the atmosphere.

6. In udder washing apparatus, a casing adapted to engage against and seal to an udder adjacent the body of the animal, a water receptacle communicating with the casing, a perforated pipe coiled within the casing and having one end thereof in communication with the water receptacle and the opposite end thereof closed, a screened outlet at the lower end of the casing and means for placing the lower end of the casing in communication with a source of suction.

7. In udder washing apparatus, a casing adapted to engage against and seal to an udder adjacent the body of the animal, a water receptacle communicating with the casing, a perforated pipe coiled within the casing and having one end thereof in communication with the water receptacle and the opposite end thereof closed, a screened outlet at the lower end of the casing, means for placing the lower end of the casing in communication with a source of suction whereby to cause a circulation of water through the casing and means for returning the water withdrawn from the casing to the water receptacle.

In testimony whereof I hereunto affix my signature.

DETLEF WM. STOVEN.